UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK, N. Y.

DISAZO DYE AND PROCESS OF MAKING SAME.

SPECIFICATION forming part of Letters Patent No. 614,391, dated November 15, 1898.

Application filed April 12, 1898. Serial No. 677,352. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Disazo Dyes; and we hereby declare the following to be a clear and exact description of our invention.

Our invention relates to the production of new disazo dyestuffs of considerable value by first diazotizing a monoacidylparanaphtylenediamin, such as acetyl-alpha$_1$ alpha$_2$ naphtylenediamin; secondly, combining the resulting diazo compound with Clève's alphanaphtylamin betasulfonic acid (1.6 or 1.7); thirdly, rediazotizing the so-produced amidoazo compound; fourthly, combining the diazoazo compound thus obtained with a naphtol mono or disulfonic acid, and, finally, treating the resulting disazo dyestuff with caustic alkalies in order to split off the acidyl group.

The new dyestuffs produced in the above-defined manner are alkaline salts of acids having the following general formula:

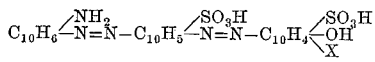

[X representing in this formula a hydrogen atom which may be substituted by a sulfo group] and are dark powders which dissolve in water with from reddish-blue to greenish-blue color. They dye unmordanted cotton in general blue shades, (these shades varying from reddish-blue to grayish-blue.) When on fiber, these dyestuffs can be further diazotized and coupled with amins or phenols, shades of considerable value being thus obtained.

In carrying out our new process practically we can proceed as follows, (without limiting ourselves to the particulars given,) the parts being by weight, 23.7 parts of the hydrochlorate of acetylparanaphtylendiamin having the formula

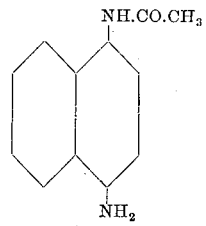

are diazotized in the usual manner with the aid of twenty parts of muriatic acid (containing twenty-three per cent. of HCl) and seven parts of sodium nitrite. The resulting diazo solution is stirred into a solution prepared from twenty-seven parts of the sodium salt of Clève's alphanaphtylaminbetasulfonic acid (1.6), twenty parts of crystallized sodium acetate, and five hundred parts of water, which solution has been cooled to 10° centigrade. After stirring the reaction mixture for a short while thirty parts of a thirty-three-per-cent. soda-lye and then eleven parts of sodium nitrite are added. The resulting solution is mixed with one hundred and ten parts of muriatic acid (containing twenty-three per cent. of HCl) and further stirred for about six hours. Subsequently the reaction mixture is filtered and the residue remaining on the filter is mixed with three hundred parts of water and then poured, with stirring, into an icy-cold solution of twenty-five parts of 2.6 naphtolsulfonate of sodium and thirty-five parts of sodium carbonate (Na$_2$CO$_3$) in five hundred parts of water. The resulting dyestuff is completely salted out by means of common salt, filtered, and pressed. The whole dyestuff is then dissolved in one thousand parts of water, which solution is mixed with one hundred and fifty parts of a strong soda-lye (containing thirty-three per cent. of NaOH) and boiled for a short while. Finally one hundred and eighty parts of common salt and eighty parts of a twenty-three-per-cent. hydrochloric acid are added. The resulting precipitate is filtered, pressed, dried, and pulverized. It is the sodium salt of an acid having the formula

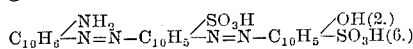

and is a black powder easily soluble in water, with a bluish-black color which changes into pure blue on the addition of a strong soda-lye or of acetic acid. It is insoluble in concentrated hydrochloric acid, while it is dissolved by concentrated sulfuric acid (66° Baumé) with a pure-blue color, from which solution a pure-blue flaky precipitate is obtained on the addition of a suitable quantity of ice.

The new coloring-matter dyes unmordanted cotton grayish-blue shades. When on fiber, the coloring-matter can be further diazotized and developed by means of betanaphtol, beautiful indigo-blue shades being thus produced. These shades are fast to acids, alkalies, washing, and against the action of light.

Having now described our invention and in what manner the same is to be performed, what we claim as new, and desire to secure by Letters Patent, is—

1. As new articles of manufacture the new disazo dyestuffs obtainable from acidyl 1.4 naphtylenediamins, Clève's alphanaphtylaminebetamonosulfo acid and naphtolsulfonic acids, which are alkaline salts of acids having the general formula

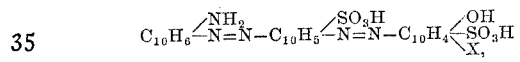

X representing in this formula a hydrogen atom that may be substituted by a sulfo group, and which are dark powders soluble in water with from reddish-blue to greenish-blue color, dyeing unmordanted cotton from reddish-blue to grayish-blue shades, which when on fiber can be further diazotized and coupled with amins or phenols shades of considerable value being thus obtained, substantially as hereinbefore described.

2. As a new article of manufacture the new disazo dyestuff obtainable from acetyl 1.4 naphtylene diamin, Clève's alphanaphtylaminbetamonosulfo acid and 2.6 naphtolmonosulfo acid being an alkaline salt of an acid having the formula

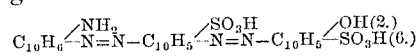

which in the form of the sodium salt is a black powder easily soluble in water with a bluish-black color that changes into pure blue on the addition of a strong soda-lye or of acetic acid, insoluble in concentrated hydrochloric acid, being dissolved by concentrated sulfuric acid with a pure-blue color from which solution a pure-blue flaky precipitate is obtained on the addition of a suitable quantity of ice, dyeing unmordanted cotton grayish-blue shades and which when on fiber can be further diazotized and developed by means of betanaphtol, beautiful indigo-blue shades, fast to acids alkalies, washing and light being thus produced, substantially as hereinbefore described.

In testimony whereof we have signed our names in the presence of two subscribing witnesses.

ADOLF ISRAEL.
RICHARD KOTHE.

Witnesses:
R. E. JAHN,
OTTO KÖNIG.